United States Patent [19]
Meissner

[11] 3,977,304
[45] Aug. 31, 1976

[54] SPRING-LOADED BRAKE CYLINDER FOR A RAILWAY VEHICLE BRAKE

[75] Inventor: Paul Willy Meissner, Munich, Germany

[73] Assignee: Knorr-Bremse GmbH, Munich, Germany

[22] Filed: Sept. 5, 1974

[21] Appl. No.: 503,492

[30] Foreign Application Priority Data
Sept. 5, 1973  Germany............................ 2344691

[52] U.S. Cl......................................... 92/30; 92/33; 92/113; 92/130 A; 188/170
[51] Int. Cl.²............................................ F16J 1/00
[58] Field of Search................. 92/3, 14, 17, 23, 30, 92/31, 33, 113, 116, 130 A; 188/170

[56] References Cited
UNITED STATES PATENTS

| | | | |
|---|---|---|---|
| 2,632,426 | 3/1953 | Geesink | 92/113 X |
| 3,003,470 | 10/1961 | Geyer | 92/17 X |
| 3,051,136 | 8/1962 | Muelhausen | 92/129 X |
| 3,183,791 | 5/1965 | Cruse | 92/129 X |
| 3,472,124 | 10/1969 | Roselius | 92/17 X |
| 3,576,152 | 4/1971 | Chevreux | 188/170 X |
| 3,696,711 | 10/1972 | Berg | 92/64 X |
| 3,704,653 | 12/1972 | Higgins | 188/170 X |
| 3,738,229 | 6/1973 | Kraft | 92/17 |
| 3,782,251 | 1/1974 | Le Marchand | 92/63 |

*Primary Examiner*—Martin P. Schwadron
*Assistant Examiner*—Abraham Hershkovitz
*Attorney, Agent, or Firm*—Edmund M. Jaskiewicz

[57] ABSTRACT

A spring-loaded brake cylinder has a piston therein one side of which is loaded by a spring and the other side of which is subjected to a pressure medium introduced into the cylinder. The cylinder is provided with an auxiliary release device comprising a screw coupling having a first coupling member which is rotatable but not axially displaceable and a second coupling member threadedly engaged with the first coupling member and acting upon the brake cylinder through an abutment coupling against the force of the load spring. The first coupling member is provided with a reversible thread and a second coupling means is provided to retain the second coupling member against rotation when the pressure acting upon the cylinder falls below a predetermined level.

9 Claims, 4 Drawing Figures

SPRING-LOADED BRAKE CYLINDER FOR A RAILWAY VEHICLE BRAKE

The present invention relates to a spring-loaded brake cylinder for use in an air braking system for railway vehicles, more particularly, to an auxiliary release device on such a brake cylinder.

Spring-loaded brake cylinders have been employed in the air brakes of railway vehicles. A pressure medium is introduced into the cylinder to act against one side of a piston therein to hold the piston in the brake release position against a loading force exerted by a load spring. The brake can now be applied by exhausting the pressure medium from the chamber and the force of the load spring will move the piston and accordingly the brake into the braking position. Such a brake cylinder is known from the German printed application 1 203 141.

If the system leading to the pressure source should develop a defect such that there is a loss in pressure the pressure medium will also escape from the cylinder of the spring-loaded brake cylinder and the spring will be released so that the brake will become actuated. If it then becomes necessary to release the brake in the absence of the pressure medium, such as for shunting the vehicle, a first screw coupling member which is not axially displaceable can be turned with a suitable tool so that the second coupling member of the screw joint is displaced axially with respect to the first coupling member. In this manner the piston is moved to its released position against the force of the load spring.

Spring-loaded brake cylinders of this general type have the substantial disadvantage in that it is necessary to screw the screw coupling members back into their coupling position subsequently to the elimination of the defect affecting the source of pressure medium. If such a screwing back is inadvertently omitted, such as by error, the spring-loaded cylinder and accordingly the brake to which it is attached are inoperable even though the braking system is now ready for operation. This situation may easily lead to serious accidents.

Another form of a spring-loaded brake cylinder such as in the German utility model patent 1,953,491 or German published specification 2,209,570 is known has a piston rod which is rigidly connected to the spring-loaded piston by means of a locking device or a bayonet catch. The piston rod may be disconnected from the piston through an arbitrary release of the locked device or the bayonet catch so that the piston rod may be moved axially with respect to the piston and the force of the load spring no longer acts upon the piston rod and thus upon the brake. When the cylinder chamber of this spring-loaded cylinder is again subjected to the action of the pressure medium the piston will be displaced again in the opposite direction toward the piston rod and the rigid connection between the piston and the piston rod will again be automatically established. The above mentioned risk of accident is largely eliminated in such a brake device. However, once the brake having such a spring-loaded cylinder is released in the absence of pressure from the source of pressure medium, the brake cannot be applied again so that when a vehicle is shunted to a new position the vehicle cannot be braked in this new position. Because of this substantial disadvantage such spring-loaded brake cylinders have not been used in practice.

The German publication document 2,160,893 shows another form of a spring-loaded brake cylinder wherein an additional manually operated pressure medium pump is connected to the cylinder chamber. When a failure or defect in the main source of pressure medium occurs, the spring-loaded cylinder may be actuated into its release position by the manually operated pump. Upon a failure of pressure, the main source of pressure medium is automatically disconnected from the cylinder chamber by means of suitable valves and when the pressure from the main source of pressure medium returns the source of pressure is again automatically connected to the cylinder chamber. The additional valves required for this type of spring-loaded brake cylinder substantially increases the cost of manufacture and the cost of installation and further requires additional space for the installation of the brake cylinder which space is frequently not available. In addition, the manual operation of the auxiliary pump is not particularly satisfactory.

It is therefore the principal object of the present invention to provide a novel and improved spring-loaded brake cylinder for railway vehicles.

It is another object of the present invention to provide a novel and improved auxiliary release device for a spring-loaded brake cylinder for a railway vehicle.

It is a further object of the present invention to provide a spring-loaded brake cylinder of the type described above which overcomes the disadvantages of known spring-loaded brake cylinders but incorporates the advantages thereof and in which the costs of construction and installation and maintenance are minimized.

According to one aspect of the present invention a spring-loaded brake cylinder for railway vehicles may comprise a piston and a first spring which acts on one side of the piston to load the piston. The other side of the piston is subjected to a pressure medium which is introduced into the cylinder chamber. A first screw coupling is provided which comprises a first coupling member and a second coupling member. The first coupling member is rotatably mounted within the cylinder but secured against axial displacement and is provided with a reversible thread. A second spring acts upon a second coupling member in the same direction as the first spring acts to load the piston at least when a pressure medium is acting against the piston. There is a second coupling means for retaining the second coupling member against rotation when the pressure acting against the piston falls below a predetermined level.

When the pressure medium is introduced into the brake cylinder, the second coupling member will always assume an end position with respect to the first coupling member which end position is in the direction of force exerted by the load spring. When the pressure in the brake cylinder drops because of a defect in the source of pressure medium the second coupling means retains the second coupling member against rotation so that upon turning of the first coupling member the second coupling member will be axially displaced with respect to the first coupling member and thus moves the piston through a friction coupling into its released position against the force of the load spring. Upon the return of pressure into the cylinder chamber, the second coupling means becomes disengaged and the second coupling member is automatically screwed back into its initial position because of its reversible thread. If there has been any movement of the vehicle, such as by shunting or towing, and the brake should be applied again in spite of the defective source of pressure medium, the second coupling member will be held against rotation by the second coupling means wherein the load spring is unstressed and the first coupling member can now be rotated to return the second coupling member to its initial position.

The first coupling member may comprise a threaded shaft and the second coupling member may comprise a nut threaded upon this shaft. As a result, the spring-loaded cylinder requires a minimum of installation space since the outer dimension of the spring-loaded cylinder does not vary upon actuation of the auxiliary release device when the first coupling member is rotated. However, according to the present invention the first coupling member can be in the form of a nut and the second coupling member in the form of a threaded shaft which is threaded into the nut.

Other objects and advantages of the present invention will be apparent upon reference to the accompanying description when taken in conjunction with the following drawings which are exemplary, wherein;

FIG. 1 is a longitudinal sectional view of a spring-loaded brake cylinder according to the present invention and in the release position and in which the left side of the figure shows the position of the components when release is effected by the action of the pressure medium and the right side of the drawing shows the position of the parts when release is effected by actuating the auxiliary release device:

Proceeding next to the drawings wherein like reference symbols indicate the same parts throughout the various views a specific embodiment and a modification of the present invention will be described in detail.

Figure 1:
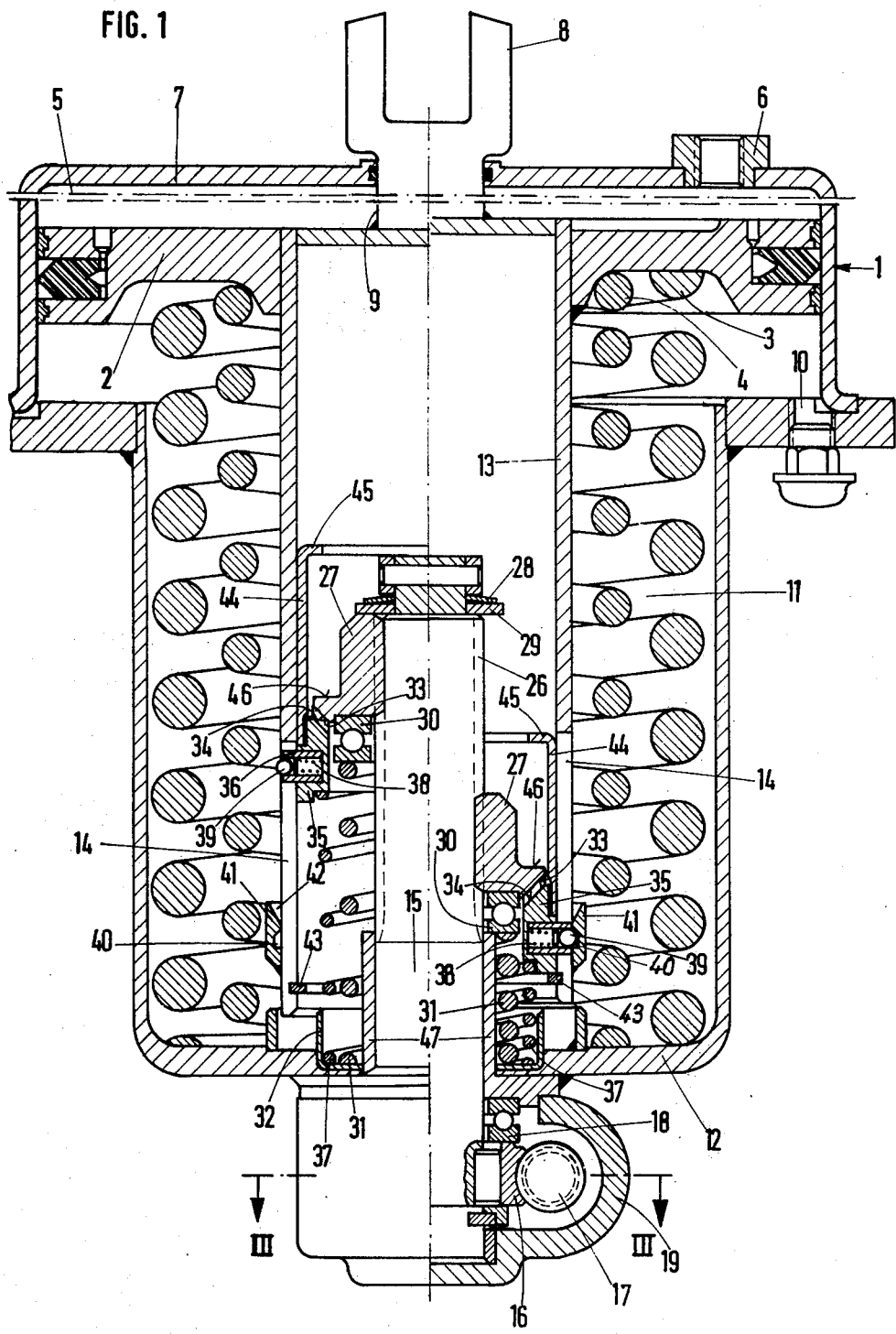
Figure 2:
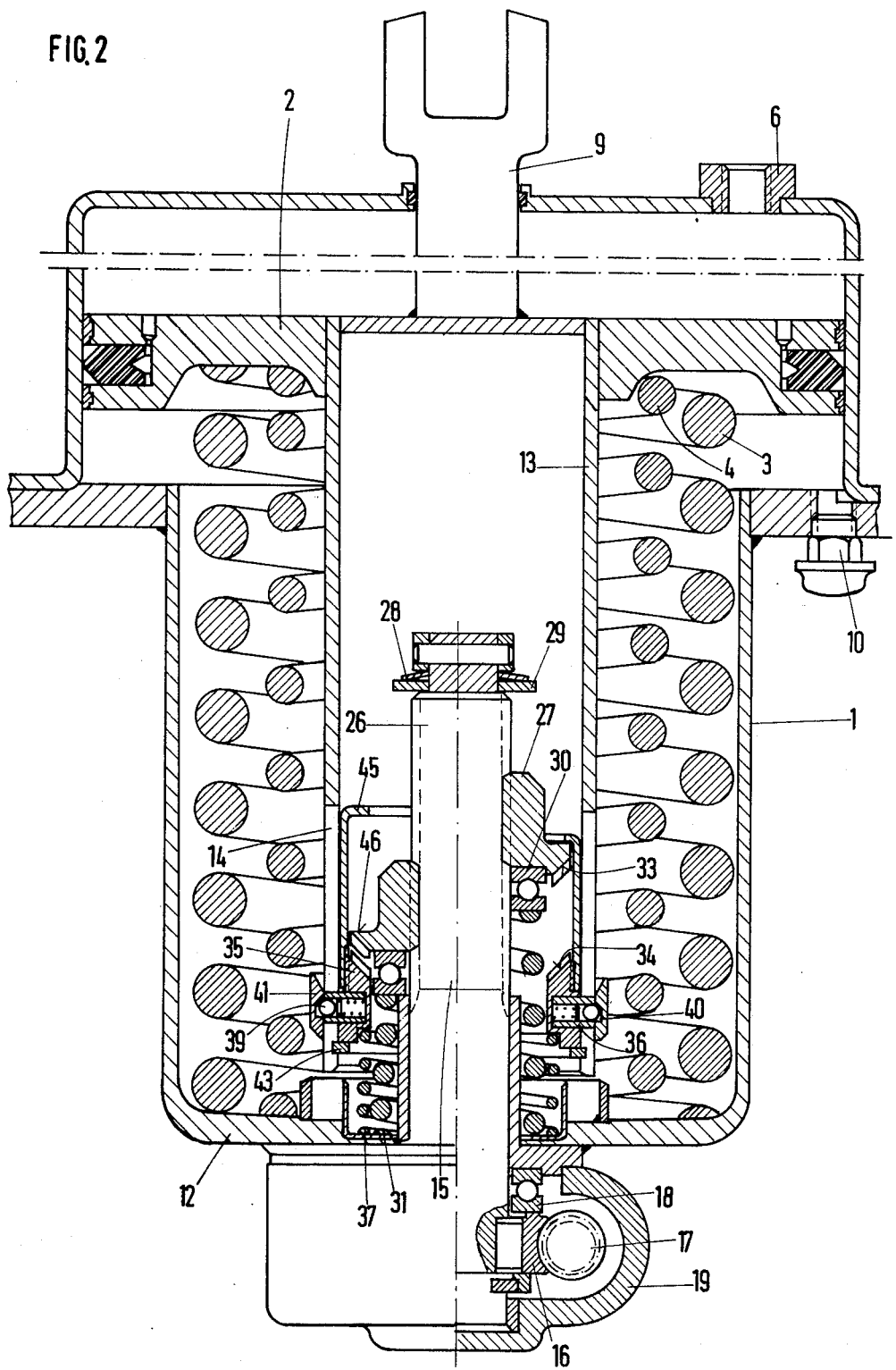
FIG. 2 is a view similar to that of FIG. 1 but showing the parts in position when the spring-loaded piston is subjected to the action of pressure medium and the auxiliary release device is actuated.
Figure 3:
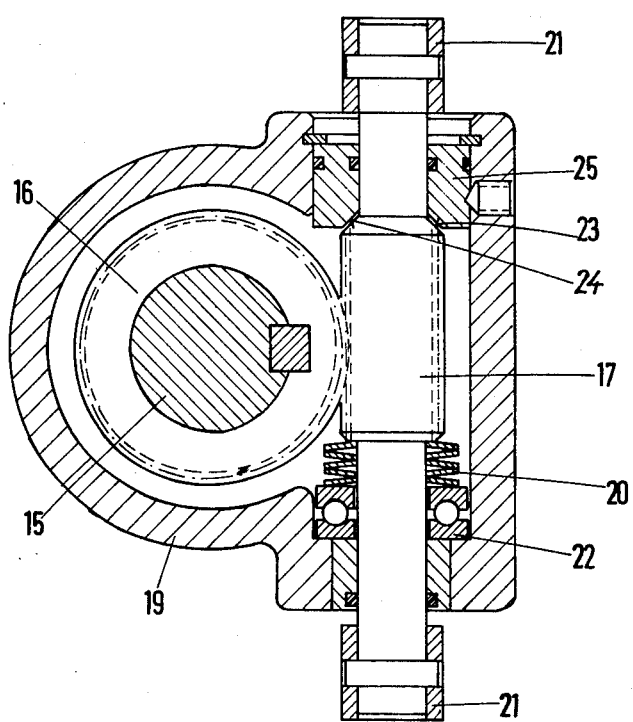
FIG. 3 is a sectional view taken along the line III—III of FIG. 1.

As may be seen in FIGS. 1–3, the spring-loaded brake cylinder of the present invention comprises a cylinder housing 1 within which a spring-loaded piston 2 is guided for axial displacement in sealing relationship with the cylinder. One side of piston 2 is acted upon by a load spring comprising two coil compression springs 3 and 4 and the other side of the piston 2 is acted upon by pressure within a cylinder chamber 5. The chamber 5 has a fitting 6 for connection to a source of compressed air which is not shown in the drawing but is known in the art.

The piston 2 has a piston rod 9 that extends through chamber 5 and is sealing and slidably positioned in a suitable opening in a cover 7 of the cylinder housing 1. The other end of the piston rod 9 is provided with a forkhead 8 which is connected to the brake for the railway vehicle in a manner known in the art and not further illustrated.

The load springs 3,4 are positioned in a chamber 11 provided with a vent 10 and the end of the springs 3 and 4 away from the piston 2 rests upon bottom 12 of the cylinder housing 1. A tubular element 13 is connected to the piston 2 and projects into the chamber 11. The end of the tubular element 13 toward the bottom 12 is open and the tubular element is provided with axial slots 14.

A shaft 15 is rotatably mounted in bottom 12 of cylinder housing but is retained against axial displacement. The end of shaft 15 which projects outwardly of the housing 1 has a worm wheel 16 non-rotatably mounted thereon which meshes with a worm gear 17. A thrust bearing 18 secures the worm wheel 16 and the shaft 15 on the bottom 12 of the cylinder housing. The worm wheel 16 and worm gear 17 form a worm drive which is enclosed by a gearing housing 19 bolted to the bottom 12 of the cylinder housing.

As can be best seen in FIG. 3, the worm gear 17 is mounted in the housing 19 with only limited axial displacement against the force of a spring 20 and both ends of the worm gear which project outwardly of the housing 19 are provided with a hexagonal head 21 by means of which the worm gear can be actuated by a suitable tool. The spring 20 is against the housing 19 by means of a thrust bearing 22 and urges a conical coupling surface 23 on the worm gear 17 into a corresponding conical surface 24 formed in an insert 25 mounted against rotation within the housing 19. The conical surfaces 23 and 24 together with the spring 20 form a spring loaded friction clutch that prevents rotation of the worm in a direction of rotation which is to be described below in greater detail.

The shaft 15 has a threaded portion 26 which comprises a reversible thread upon which a nut 27 is threaded. The free end of shaft 15 is provided with a ring 29 cushioned by a plate spring 28 to prevent the nut 27 from being unthreaded from the shaft. The nut 27 is loaded toward the ring 29 in the direction of loading of springs 3,4 through an axial bearing 30 upon which acts a coil compression spring 31 which surrounds shaft 15 and whose other end rests upon bottom 12 within a spring cage 32. Adjacent its outer periphery the nut 27 is provided with a conical coupling surface which may be indented or toothed. The coupling surface 33 engages a correspondingly indented coupling surface 34 provided on a coupling ring 35. The coupling ring 35 is non-rotatably mounted for axial displacement within the tubular element 13 by means of two radially extending sleeves 36 press-fitted into the ring 35 and received within the longitudinal slots 14. In the direction toward nut 27, the coupling ring 35 is loaded by a compression spring 37 whose other end rests within the spring cage 32 on the cylinder bottom 12. The spring 37 is weaker in force than the spring 31.

Within each of the sleeves 36 is a ball 39 loaded by a compression spring 38 such that the balls function as detent or catch elements of the ball-locking device so as to be engageable with a locking recess 40 provided on the inner periphery of a ring 41 welded to the outer surface of the tubular element 13. On the surface of ring 41 directed toward the piston 2 there is provided an inclined cam surface 42 which is engageable by locking balls 39 which normally project beyond the outer periphery of the tubular element 13 and are secured within their respective sleeves 36 by internal flanges formed on the outer edges of the sleeves 36.

On the end of the tubular element 13 directed away from piston 2 there is defined a radial shoulder by means of a retaining ring 43 secured on the inner surface of the tubular element 13. The ring 43 functions as an abutment stop for coupling ring 35 and, as will be subsequently described in greater detail, as an abutment coupling between nut 27 and tubular element 13 or piston 2. The ring 41 is so attached to the tubular element 13 that when the coupling ring 35 abutts the shoulder 43 the locking balls 39 will engage locking recess 40 to lock a coupling ring 35 axially with respect to the tubular element 13.

On the side of coupling ring 35 away from shoulder 43 there is attached a tubular member 44 provided with a radially inwardly directed flange 45 which extends over an abutment surface 46 on the nut 27. As shown in FIG. 1, the nut 27 and the coupling ring 35 are in the coupled position and in this position the shoulder 45 on tubular member 44 and abutment surface 46 on nut 27 are spaced from each other.

In order to limit the axial movement of nut 27 in the direction toward cylinder bottom 12 there is provided a stop 47 which is attached to the cylinder housing 1 and comprises a tube surrounding shaft 15 so as to also function as a guide for the shaft. The thrust bearing 30 may abut against stop 47. The stop 47 is so positioned that upon contact of nut 27 or thrust bearing 30 with abutment 47 the spring-loaded piston 2 subjected to the action of a pressure medium within cylinder chamber 5 is still capable of moving a short distance in the loading direction of the spring 3,4. This distance is at least equal to the distance required for disengagement of the toothed coupling surfaces 33 and 34.

The spring-loaded brake cylinder of the present invention as described above will function as follows:

When the pressure medium is introduced through connection fitting 6 into the cylinder chamber 5, the components of the cylinder will be in the position as shown at the left side of FIG. 1. The piston 2 is urged against the force of load spring 3,4 toward the bottom 12 of cylinder housing which as viewed in the drawing is in a downward direction. In this position the brake device which may be the form of a shoe or a pad and attached to the fork 8 of piston rod 9 is in the release position. Because of the force exerted by spring 31, nut 27 will be in contact with ring 29 and coupling surface 34 of coupling ring 35 will engage coupling surface 33 of nut 27 under the action of compression spring 37 acting on the coupling ring 35. The sleeves 36 of the coupling ring 35 will be at the upper or piston ends of slots 14.

Upon venting or exhausting cylinder chamber 5 in order to actuate the brakes, the spring 3,4 will force the piston 2 upwardly in the drawings so as to apply the brake. The length of slots 14 with respect to the shoulder 43 is such that at the maximum brake stroke the shoulder 43 will not contact coupling ring 35 or its sleeves 36.

In the event that the cylinder chamber 5 is vented because of a defect or failure in the system leading to the source of pressure medium and attached at connection 6, according to the present invention an auxiliary release of piston 2 can be achieved against the loading force of spring 3,4 in the following manner.

One of the hexagonal heads 21 of the worm drive as shown in FIG. 3 is rotated with a suitable tool in order to rotate the worm gear 17 in such a manner that through the meshing of worm wheel 16 the shaft 15 is rotated in such a direction as to be threaded into the nut 27. The pitch of the worm thread is such that under the effect of the force of the reaction exerted by worm wheel 16 on worm 17 the worm 17 is axially displaced slightly in the opening direction of the friction cone clutch 23,24 against the force of spring 20.

Nut 27 is retained against rotation by the engagement of coupling surfaces 33 and 34 and coupling ring 35 together with sleeves 36 that are engaged in slots 14 are also displaced along shaft 15 toward the cylinder bottom 12 because of the rotation of shaft 15. After coupling ring 35 abuts shoulder 43 on tubular member 13, the tubular member 13 together with piston 2 are also displaced in this direction. The spring-loaded piston 2 is thus displaced in the brake release direction while spring 3,4 is being loaded.

When the coupling ring 35 contacts shoulder 43 the balls 39 of the ball catch device will be cammed along surface 42 of ring 41 to engage lock groove 40 to thus lock the coupling ring 35 with respect to the tubular member 13 of the piston rod. The movement of nut 27 along shaft 15 and the movement of the spring-loaded piston 2 is limited by the abutment of thrust bearing 30 and thus nut 27 with the abutment tube 47 as shown on the right side of FIG. 1. A comparison of the left and right sides of FIG. 1 will show that upon contact of nut 27 with abutment 47 the piston 2 will not yet reach its limit position which can be attained under the action of the pressure medium. The difference between these two positions of the piston is at least equal to the disengagement distance of coupling surfaces 33 and 34. However, the brake attached to the rod 9 is already fully released in this auxiliary release position of the piston.

A rotation of nut 27 on spindle 15 under the force of spring 3,4 which would return nut 27 to its initial position is prevented because of the known irreversibility of worm drive 16, 17 and through the engagement of cone coupling surfaces 23,24.

Thus, according to the present invention, even when the supply of pressure medium fails in a vehicle whose brake device is equipped with such a spring-loaded brake cylinder, the brake can still be released to permit movement of the vehicle, such as towing or switching thereof. After being so moved, the vehicle can again be braked in spite of the defect in the supply of pressure medium by rotating the worm 17 and accordingly shaft 15 in the opposite direction until coupling nut 27 and coupling ring 35 are returned to their initial positions as shown on the left side of FIG. 1. In this position the load spring 3,4 is again fully effective.

When the piston 2 is in its auxiliary release position as shown on the right side of FIG. 1, and a pressure medium is again introduced into chamber 5 after the defect of the source of pressure medium has been remedied, the piston 2 will move initially into its end position as shown on the left side of FIG. 2 while further compressing load spring 3,4. Since coupling ring 35 is locked to tubular member 13 by means of the ball locking device 39,40, the coupling ring 35 will also be carried along with this movement to bring about a disengagement of coupling surfaces 33, 34. As a result, the nut 27 is no longer secured against rotation. The force of spring 37 is less than the locking force of the ball locking device 39,40 so that spring 37 is not capable of releasing or disengaging locking device 39,40. However, spring 31 will now urge nut 27 upwardly so that the nut 27 is rotated around shaft 15 and is threaded toward ring 29. As soon as abutment surface 46 on nut 27 engages shoulder 45 on the tubular member 47 which functions as a carrier device and is illustrated on the right side of FIG. 2, the combined force of springs 31 and 37 is sufficient to release the ball locking device 39,40 so that coupling ring 35 is also released and is able to follow the nut 27 in its movement along shaft 15. Since spring 31 is stronger than spring 37, the nut 27 will contact ring 29 before the two coupling surfaces 33 and 34 are again engaged. Subsequently, the components of the spring-loaded cylinder are returned to the fully operational position as shown on the left side of FIG. 1 automatically without the necessity of any additional operations, manually or otherwise, that may bring about accident when this return threading is erroneously omitted.

Under certain condition, it may be expedient to guide piston 2 or piston rod 9 so that these components are not capable of rotation, but such a modification is not shown in the drawing.

Figure 4:
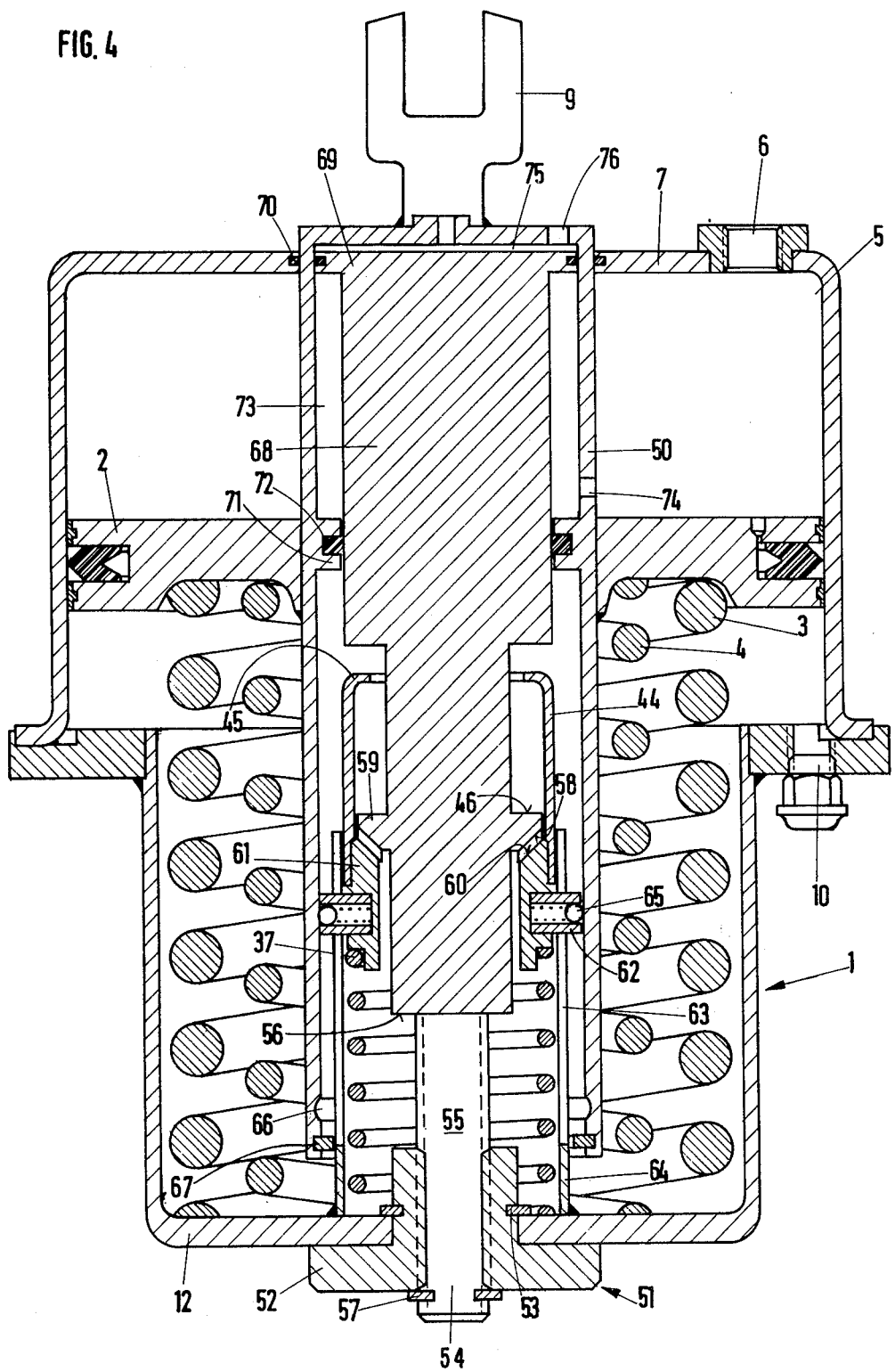
FIG. 4 is a view similar to that of FIG. 1 but showing a modification thereof.

In FIG. 4 there is shown a modification of the spring-loaded brake cylinder of the present invention. The components of the modification of FIG. 4 which are the same as the embodiment of FIG. 1 are designated with the same reference numerals. Thus, in FIG. 4 there is a cylinder housing 1 within which is mounted a spring-loaded piston 2 subjected on one side to the force of a load spring consisting of compression springs 3 and 4 and on its other side subjected to the pressure of a pressure medium in cylinder chamber 5 which is connected at 6 to a source of the pressure medium. The piston 2 is provided with a tubular piston rod 50 which extends axially through chamber 5 and is slidably and sealingly positioned in an opening in cover 7. A piston rod 9 having a fork connection 8 for brake linkage is attached to the piston rod 50.

On cylinder housing bottom 12, a nut 51 is rotatably mounted but retained against axial displacement. The nut 51 has a shoulder 52 extending outwardly of cylinder housing 1 and on the inner side of bottom 12 the nut 51 is retained against axial movement by a retaining ring 53. A shaft 54 comprising a threaded section 55 having a reversible thread is screwed into the nut 51. The shaft 54 extends axially within the tubular piston rod 50 and is limited in its axial displacement with respect to nut 51 by means of a shoulder 56 and a retaining ring 57.

The shaft 54 is also provided with a radial shoulder 59 on which is a conical toothed coupling surface 58 engageable with a corresponding coupling surface 60 on a coupling ring 61 which is guided for axial displacement but non-rotatable within the tubular member 64 welded to the inner surface of cylinder housing bottom 12. The tubular member 64 comprises axial slots 63 within which are received sleeves 62 which are radially pressed-fitted into the coupling ring 61. Only two of the sleeves 62 are shown but it is to be understood that additional sleeves may be employed.

Compression spring 37 loads the coupling ring 61 and sleeves 62 projecting through slot 63 terminate short of the inner surface of the tubular piston rod 50 which surrounds the tubular element 64. A spring-loaded ball 65 is guided within each sleeve 62 such that the balls are the lock or detent elements of a ball locking device and the balls are locked in an annular groove 66 formed on the inner surface of the lower end of tubular piston rod 50. The annular groove 66 is so spaced from retaining ring 67 that upon contact of sleeve 62 with retaining ring 67 the balls 65 are engageable with the annular groove 66 to thus lock coupling ring 61 with respect to piston rod tube 50 and accordingly with piston 2. The locking force of ball locking device 65,66 is greater than the force of spring 37 so that this spring is not able to disengage the locking connection between coupling ring 61 and tubular piston rod 50.

On the side of coupling ring 61 directed toward the piston 2 a tubular member 44 is attached and is provided with a radially inwardly directed shoulder or flange 45 which extends over an abutment surface 46 of shoulder 59.

Wherein the coupling ring 61 is coupled to shaft 54 to coupling surfaces 60 and 58, the shoulder 45 is spaced from abutment surface 46.

The shaft 54 is provided with a cylindrical extension 68 having a shoulder 69 at its upper end as viewed in FIG. 4. The shoulder 69 is axially displaceable within the tubular piston rod 50 and is sealed thereto by means of a packing 70. The tube 50 is also provided with an internal shoulder 71 having a packing 72 slidably engageable with the outer surface of cylindrical extension 68. An annular admission chamber 73 is thus formed between the shoulders 69 and 71 and communicates with the cylinder chamber 5 through a bore 74. A chamber 75 is also defined above the extension 68 and is connected to the atmosphere through a bore 76 formed in the end of the tubular piston rod 50. The principle of operation of the spring-loaded cylinder of FIG. 4 is the same as that of the spring-loaded cylinder of FIGS. 1–3. When the chamber 5 is subjected to the action of a pressure medium, such as compressed air which is generally used in such braking systems, the components of the cylinder will assume the position as shown in FIG. 4 in which the piston 2 is in its release position against the force exerted by spring 3,4. When the pressure in chamber 4 decreases, the spring-loaded piston 2 will move upwardly under the force of spring 3,4 as a result of which a brake device attached to the piston rod 9 will be actuated into the braking position.

Should the supply of pressure medium to chamber 5 fail for any reason, the spring-loaded piston 2 can be returned into its released position by turning nut 51 with a suitable tool. The shaft 54 which is held against rotation by coupling ring 61 is displaced axially such that its lower end moves outwardly from cylinder housing 1. This axial movement of shaft 54 will also cause the tubular piston rod 50 and accordingly piston 2 to move downwardly into its release position against the force of spring 3,4 since coupling ring 61, sleeve 62 will abut retaining ring 67. The ball locking device 65,66 will now be locked. The axial movement of shaft 54 and together therewith that of piston 2 is limited by the abutment of shaft shoulder 56 against the inner face of nut 51. At this point, the piston 2 is not quite yet in its end position which position is achieved by the action of pressure medium within chamber 5. The distance with which piston 2 must still travel to reach this position is at least equal to the distance required for disengagement of the two coupling surfaces 58 and 60.

After the vehicle equipped with this spring-loaded cylinder is moved and while the source of pressure medium is still defective the spring-loaded cylinder can again be made effective by rotating the nut 51 in the opposite direction to cause shaft 54 to be again displaced axially in the opposite direction, since the shaft 54 is held against rotation by coupling ring 61. The shaft 54 will be displaced until retaining ring 57 contacts the outer face of nut 51. The spring-loaded piston 2 will again assume its effective position under the action of springs 3,4.

If cylinder chamber 5 is again subjected to action of pressure medium such as would occur after the defect in the source of pressure medium has been remedied, while the spring-loaded cylinder is released in an auxiliary manner by means of nut 51 and shaft 54, the piston 2 will move against the force of spring 3,4 through the remaining residual distance into its maximum release position. As a result, coupling ring 61 will be carried along by locking device 65,66 since compression spring 37 will not be able to release locking device 65,66. Accordingly, the coupling surfaces 58 and 60 will be disengaged. While the annular chamber 73 is subjected to the action of pressure medium through bore 74, the shaft 54 will be able to move upwardly through rotation because of the reversible thread of its threaded portion 55. When abutment surface 46 contacts shoulder 45 of tubular member 44, the locking device 65,66 will be released because the force now acting on coupling ring 65 in addition to that of spring force 37 will cause the coupling ring to be also displaced upwardly until it attains the position shown in FIG. 1 and the cylinder is again in full operational position.

In the modification of FIG. 4, the nut 51 may also be rotated by means of a worm drive as disclosed with respect to the embodiment of FIGS. 1–3.

In addition, the spring-loaded cylinder may be preceded in a conventional manner by a brake actuation cylinder which assumes its brake actuation position upon the action of pressure medium. Similarly, the spring-loaded cylinder may also comprise a piston rod adjusting device as known in the art. In the embodiment as shown in FIGS. 1–3, such an adjusting device may be positioned within the tubular member 13 which is extended upwardly with respect to the drawing.

The spring-loaded cylinder according to the present invention may be used with various kinds of pressure media, including but not limited to compressed air and hydraulic fluid.

Thus it can be seen that the present invention has disclosed a spring-loaded brake cylinder having an auxiliary release device which is simple and effective in operation and which requires a minimum of space and maintenance.

It will be understood that this invention is susceptible to modification in order to adapt it to different usages and conditions, and accordingly, it is desired to comprehend such modifications within this invention as may fall within the scope of the appended claims.

What is claimed is:

1. A spring-loaded brake cylinder for an air-brake system of a railway vehicle and having an auxiliary release device, comprising a cylinder having a piston therein and a first spring acting on one side of the piston to load the same in one direction and the other side of the piston being subjected to a pressure medium introduced into the cylinder, a first screw coupling comprising first and second coupling members, said first coupling member comprising a threaded shaft having a reversible thread thereon rotatably mounted within said cylinder and supported against axial displacement, said shaft having a first end, said second coupling member including a nut threaded upon said shaft, a compression spring acting upon said second coupling member, second coupling means for coupling said second coupling member to said spring loaded piston for retaining said second coupling member against rotation when the pressure acting against said piston is below a predetermined level, said second coupling means comprising an axially displaceable non-rotatable annular coupling element surrounding one of said first and second coupling members and having a coupling surface engageable with a corresponding coupling surface on the other of said first and second coupling members, a tubular member attached to said spring loaded piston, means for guiding non-rotatably said annular coupling element for axial displacement within said tubular member, an annular shoulder on said tubular member, said annular coupling element being disposed between said annular shoulder and one of said first and second coupling members, abutment means for limiting the axial displacement of said nut relative to said first end of said shaft in a direction opposite to said one direction of loading of said first spring, upon abutting engagement of said second coupling member with said abutment means said piston can be displaced by the pressure medium a distance greater than the distance required for disengagement of said second coupling member from said spring-loaded piston, and spring biased means for locking said annular coupling element with respect to said spring loaded piston upon abutting engagement of said second coupling member with said abutment means, and a third spring acting against said annular coupling element with a force less than the locking force of said spring biased locking means.

2. In a spring-loaded brake cylinder as claimed in claim 1 wherein said second coupling means comprises an axially displaceable non-rotatable annular coupling element surrounding said nut and having a coupling surface engageable with a corresponding surface on said nut.

3. In a spring-loaded brake cylinder as claimed in claim 1 wherein said second coupling means comprises corresponding coupling surfaces on said annular coupling element and said nut which are toothed.

4. In a spring-loaded brake cylinder as claimed in claim 1 and carrier means disposed adjacent said nut and said annular coupling element and actuated upon disengagement of said second coupling means, the spring forces acting upon said second coupling member and said annular coupling element being greater than the locking force of said spring biased locking means.

5. In a spring-loaded brake cylinder as claimed in claim 4 wherein said carrier means comprises a tubular element attached to said annular coupling element and having a radial portion extending over said nut, said radial portion engaged by said nut upon uncoupling of said nut and said annular coupling element upon movement of said nut in said one direction.

6. In a spring biased brake cylinder as claimed in claim 1 and worm drive means drivingly engaging said shaft and operable exteriorly of the brake cylinder.

7. In a spring-loaded brake cylinder as claimed in claim 6 wherein said worm drive means comprises a worm gear having limited axial displacement, and means on said worm gear and a stationary portion of the cylinder for defining a spring actuated friction coupling.

8. In a spring-loaded brake cylinder as claimed in claim 7 wherein said friction coupling comprises corresponding conical surfaces.

9. In a spring-loaded brake cylinder as claimed in claim 7 wherein said friction coupling prevents said first spring from causing rotation of the nut.

* * * * *